(12) United States Patent
Selberg et al.

(10) Patent No.: US 10,125,653 B2
(45) Date of Patent: Nov. 13, 2018

(54) SYSTEM AND METHOD FOR ENGINE EMISSION CONTROL HARNESS

(71) Applicant: General Electric Company, Schenectady, NY (US)

(72) Inventors: Robert Jarvis Selberg, Waukesha, WI (US); Jared J. Wentz, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 318 days.

(21) Appl. No.: 14/626,511

(22) Filed: Feb. 19, 2015

(65) Prior Publication Data
US 2016/0245144 A1  Aug. 25, 2016

(51) Int. Cl.
*F01N 9/00* (2006.01)
*G01M 15/05* (2006.01)
(Continued)

(52) U.S. Cl.
CPC ............ *F01N 9/007* (2013.01); *F01N 11/002* (2013.01); *F01N 11/007* (2013.01); *F02D 41/1441* (2013.01); *F02D 41/2432* (2013.01); *F02D 41/2435* (2013.01); *F02D 41/28* (2013.01); *G01M 15/05* (2013.01); *F01N 2430/06* (2013.01); *F01N 2550/02* (2013.01); *F01N 2560/02* (2013.01); *F01N 2560/06* (2013.01); *F01N 2560/07* (2013.01); *F01N 2900/0408* (2013.01); *F01N 2900/08* (2013.01); *F01N 2900/1402* (2013.01); *F01N 2900/1404* (2013.01); *F01N 2900/1406* (2013.01); *F02D 41/2474* (2013.01); *F02D 2041/281* (2013.01); *F02D 2200/604* (2013.01); *F02D 2400/22* (2013.01); *Y02T 10/47* (2013.01)

(58) Field of Classification Search
CPC ...... F01N 9/007; F01N 11/002; F01N 11/007; F01N 2550/02; F01N 2900/0408; F01N 2900/1402; F01N 2900/1404; F01N 2900/1406; F02D 41/1441; F02D 41/2434; F02D 41/2435; F02D 41/28; F02D 41/2474; F02D 2041/281; F02D 2200/604; F02D 2400/22; G01M 15/05
USPC .......... 701/103, 108, 114, 115; 60/276, 285, 60/286, 295–303; 123/672–703; 73/114.69, 114.71, 114.72, 114.73, 73/114.75
See application file for complete search history.

(56) References Cited

U.S. PATENT DOCUMENTS 4,121,452 A * 10/1978 Wakabayashi ........ G01M 17/06 73/114.58
4,441,359 A *  4/1984 Ezoe ................... G01M 15/044 701/33.8

(Continued)

*Primary Examiner* — David Hamaoui
*Assistant Examiner* — Susan Scharpf
(74) *Attorney, Agent, or Firm* — Fletcher Yoder, P.C.

(57) ABSTRACT

A method includes determining an identity of each sensor of a plurality of sensors arranged within an engine system and coupled to a harness of the engine system, loading a calibration for each sensor of the plurality of sensors from a memory based at least in part on the determined identity of the respective sensor, and determining a configuration of the plurality of sensors based at least in part on the determined identities of the plurality of sensors. The plurality of sensors includes exhaust sensors configured to monitor a flow property of engine exhaust.

20 Claims, 4 Drawing Sheets

(51) Int. Cl.
*F01N 11/00* (2006.01)
*F02D 41/14* (2006.01)
*F02D 41/24* (2006.01)
*F02D 41/28* (2006.01)

(56) References Cited

U.S. PATENT DOCUMENTS

| | | | | |
|---|---|---|---|---|
| 5,396,794 A * | 3/1995 | Nichols | | F01N 11/00 73/114.73 |
| 5,648,601 A * | 7/1997 | Katoh | | G01N 33/007 73/1.06 |
| 5,651,247 A * | 7/1997 | Frankle | | B01D 53/9431 60/274 |
| 5,722,236 A * | 3/1998 | Cullen | | F01N 3/0814 60/274 |
| 5,732,552 A * | 3/1998 | Matsumoto | | F01N 11/007 60/276 |
| 6,082,102 A * | 7/2000 | Wissler | | B01D 53/8696 60/286 |
| 6,684,152 B2 * | 1/2004 | Baeuerle | | B60T 17/221 701/114 |
| 7,197,866 B2 * | 4/2007 | Cook | | F02D 41/1441 204/424 |
| 7,558,668 B2 * | 7/2009 | Ammineni | | F01N 11/002 60/287 |
| 7,891,177 B2 * | 2/2011 | Ammineni | | F02D 41/0235 60/297 |
| 7,945,358 B2 * | 5/2011 | Avery | | G01R 31/007 340/425.1 |
| 8,180,463 B2 | 5/2012 | Capps et al. | | |
| 8,427,328 B1 | 4/2013 | Leblang | | |
| 8,560,168 B2 * | 10/2013 | Ruther | | B60R 16/0315 370/338 |
| 8,688,319 B2 * | 4/2014 | Jager | | B60W 50/045 340/10.1 |
| 8,887,490 B2 | 11/2014 | Wentz et al. | | |
| 9,558,134 B2 * | 1/2017 | Uemura | | G06F 13/28 |
| 9,658,980 B2 * | 5/2017 | Uemura | | G06F 13/4086 |
| 2001/0014298 A1 * | 8/2001 | Neufert | | B01D 53/9431 422/177 |
| 2002/0116114 A1 * | 8/2002 | Little | | F02D 41/2487 701/114 |
| 2003/0182994 A1 * | 10/2003 | Huller | | F01N 11/00 73/114.73 |
| 2004/0103727 A1 * | 6/2004 | Erlach | | F02M 25/035 73/863.01 |
| 2005/0022510 A1 * | 2/2005 | Nakagawa | | F01N 3/101 60/285 |
| 2006/0030980 A1 * | 2/2006 | St. Denis | | G01M 15/102 701/32.7 |
| 2008/0066454 A1 * | 3/2008 | Viola | | F01N 3/208 60/286 |
| 2008/0066455 A1 * | 3/2008 | Viola | | F01N 3/208 60/286 |
| 2009/0240391 A1 | 9/2009 | Duddle et al. | | |
| 2009/0293452 A1 * | 12/2009 | Tarabulski | | F01N 3/035 60/276 |
| 2010/0049462 A1 * | 2/2010 | Krafthefer | | F01N 3/023 702/104 |
| 2010/0100305 A1 * | 4/2010 | Bartick | | F02D 41/1475 701/109 |
| 2011/0011068 A1 * | 1/2011 | Ren | | F01N 13/0097 60/297 |
| 2012/0117942 A1 * | 5/2012 | Kowalkowski | | F02D 41/146 60/273 |
| 2015/0308998 A1 * | 10/2015 | Suzuki | | B60L 11/1881 73/31.05 |
| 2016/0146142 A1 * | 5/2016 | Harper | | G01N 33/0036 123/703 |

* cited by examiner

SYSTEM AND METHOD FOR ENGINE EMISSION CONTROL HARNESS

BACKGROUND

The subject matter disclosed herein relates to engine emissions, and more specifically to a harness that facilitates control of engine emissions.

An internal combustion engine is an engine where the combustion (i.e. burning) of a fuel occurs with an oxidizer (usually air) in a combustion chamber. In an internal combustion engine, the expansion of high-pressure gas produced by combustion applies a force to a piston, turbine, or other component of the engine. Thus, the internal combustion engine takes chemical energy from combustion and turns it into mechanical energy.

The ratio of fuel and air plays an important role in how the internal combustion engine functions. The air/fuel ratio to combust gasoline may be, for instance, roughly 14.7:1, depending on the type and quality of fuel. A rich-burn engine may operate at an air/fuel ratio near that combustion point, such as near 12:1. In contrast, in a lean-burn engine, the engine burns fuel with an excess of air in the internal combustion engine, such as air/fuel ratio 65:1.

The oxidizer and fuel may not fully react within the combustion chamber, resulting in products of incomplete combustion (i.e., emissions) in the engine exhaust, such as nitrogen oxides and carbon monoxide, among others. Catalysts that receive the engine exhaust may reduce the emissions. However, the air/fuel ratio of the internal combustion engine and operating conditions (e.g., temperature) of the catalyst may affect the effectiveness of the catalyst. Moreover, catalyst composition, catalyst configuration, and internal combustion engine control inputs may vary between different internal combustion engine installations.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an engine control system with a harness, a memory, and an engine control module. The harness includes a plurality of ports, and each port of the plurality of ports is configured to couple with a sensor. The memory is configured to store calibrations and control modes corresponding to a plurality of sensor configurations. The engine control module is coupled to the harness and the memory, and the engine control module is configured to load a first set of calibrations from the memory corresponding to a first configuration of sensors to control emissions from an engine system in a first control mode when the first configuration of sensors is coupled to the harness. The engine control module is also configured to load a second set of calibrations from the memory corresponding to a second configuration of sensors and to control the emissions from the engine system in a second control mode when the second configuration of sensors is coupled to the harness.

In a second embodiment, a method includes determining an identity of each sensor of a plurality of sensors arranged within an engine system and coupled to a harness of the engine system, loading a calibration for each sensor of the plurality of sensors from a memory based at least in part on the determined identity of the respective sensor, and determining a configuration of the plurality of sensors based at least in part on the determined identities of the plurality of sensors. The plurality of sensors includes exhaust sensors configured to monitor a flow property of engine exhaust.

In a third embodiment, a system a human machine interface and an engine control system. The human machine interface includes a display configured to display information based at least in part on operation of an engine system coupled to the human machine interface, and the human machine interface includes operator controls configured to receive operator input. The engine control system includes a harness coupled to a plurality of sensors and an engine control module coupled to the harness and to the human machine interface. The engine control system is configured to determine a configuration of the plurality of sensors coupled to the harness based at least in part on identities of the plurality of sensors. The engine control module is also configured to enable and disable the operator controls of the human machine interface based at least in part on the configuration of the plurality of sensors. The engine control module is also configured to control an exhaust from the engine system based at least in part on the operator input and feedback from the plurality of sensors.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
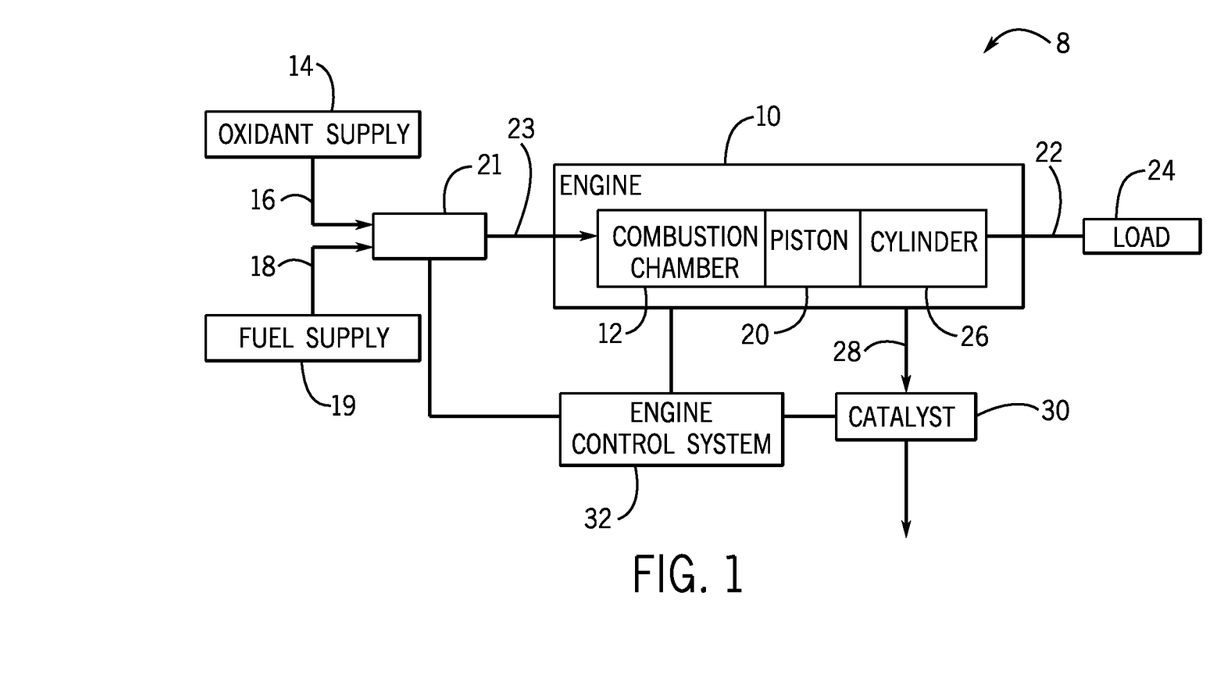
FIG. 1 is a block diagram of an embodiment of an engine system.

FIG. 1 illustrates a block diagram of an engine control system 32 for an engine system 8, such as internal combustion engine 10. The present disclosure may be used in any situation where an engine control system 32 is desirable, such as a reciprocating engine, a turbine engine, or any combination thereof. For instance, the engine control system 32 could be applied to a lean-burn reciprocating internal combustion engine or to a variety of turbine internal combustion engines. The engine system 8 includes an engine 10 having one or more combustion chambers 12 (e.g., 1, 2, 3, 4, 5, 6, 7, 8, 10, 12, 14, 16, 18, 20, or more combustion chambers). An oxidant supply 14 is configured to provide a pressurized oxidant 16, such as air, oxygen, oxygen-enriched air, oxygen-reduced air (including, but not limited to, exhaust gas recirculation), or any combination thereof, to each combustion chamber 12. The combustion chamber 12 is also configured to receive a fuel 18 (e.g., a liquid and/or gaseous fuel) from a fuel supply 19. In some embodiments, a fuel adjustment device 21 provides the oxidant 16 and the fuel 18 as an oxidant-fuel mixtures 23 (e.g., air-fuel mixture) to each combustion chamber 12. The oxidant-fuel mixture 23 ignites and combusts within each combustion chamber 12. The fuel adjustment device 21 may include, but is not limited to, a fuel system, a carburetor, a fuel injector, a fuel pass regulator, or any combination thereof. The hot pressurized combustion gases cause a piston 20 adjacent to each combustion chamber 12 to move linearly within a cylinder 26 and convert pressure exerted by the gases into a rotating motion. The rotating motion causes a shaft 22 to rotate. The shaft 22 may be coupled to a load 24, which is powered via rotation of the shaft 22. For example, the load 24 may be any suitable device that may generate power via the rotational output of the system 10, such as an electrical generator.

Once the available energy is translated into rotating the shaft 22, the remaining fuel 18 and/or oxidant 16 is vented from the combustion chamber 12 and removed from the engine 10 as exhaust 28. The exhaust 28 includes any remaining fuel 18, oxidant 16, and products of incomplete combustion (e.g., nitrogen oxides ($NO_x$), carbon monoxide (CO), volatile organic compounds, soot). As discussed herein, the products of incomplete combustion are referred to as emissions. The exhaust 28 may be directed to a catalyst 30 (e.g., catalytic converter) that reacts with at least a portion of the emissions to form more desirable compounds. For example, the catalyst 30 may convert the emissions to more desirable byproducts, such as nitrogen (e.g. $N_2$), oxygen (e.g., $O_2$), carbon dioxide, and water. The catalyst 30 may vent the exhaust 28 and converted byproducts.

The efficiency and/or the effectiveness of the catalyst 30 may be based at least in part on the oxidant-fuel ratio of the fuel mixture 23. As may be appreciated, a low oxidant-fuel ratio may be defined as a rich mixture where the exhaust 28 vented from the combustion chamber 12 has more unreacted fuel 18, and a high oxidant-fuel ratio may be defined as a lean mixture where the exhaust 28 vented from the combustion chamber 12 has more unreacted oxidant 16. Moreover, the efficiency and/or the effectiveness of the catalyst 30 may be affected by the temperature of the exhaust 28, the pressure of the exhaust 28, the temperature of the catalyst 30, or any combination thereof. Some catalysts 30 are most effective at reducing emissions for exhaust 28 received from combustion within specific ranges of the oxidant-fuel ratio. An engine control system 32 coupled to the engine 10 and to the fuel adjustment device 21 may adjust the oxidant-fuel mixture 23 and/or the operation of the engine 10 to control the emissions of the exhaust 28 vented by the catalyst 30. As discussed in detail below, the engine control system 32 may control the engine 10 and/or the fuel adjustment device 21 based at least in part on inputs received from the engine control system 32, such as gas composition, temperature, and pressure, among others.

Although the following discussion refers to air as the oxidant 16, any suitable oxidant may be used with the disclosed embodiments. Similarly, the fuel 18 may be any suitable gaseous or liquid fuel, such as natural gas, associated petroleum gas, propane, biogas, sewage gas, landfill gas, coal mine gas, gasoline, or diesel, for example. Moreover, in some instances, the fuel 18 may vary in quality depending on the type and the environment the fuel 18 originated from. Accordingly, the emissions of the exhaust 28 received by the catalyst 30 may be based at least in part on the fuel 18 quality and the configuration of the system 8.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders 26 (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders 26 and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

Figure 2:
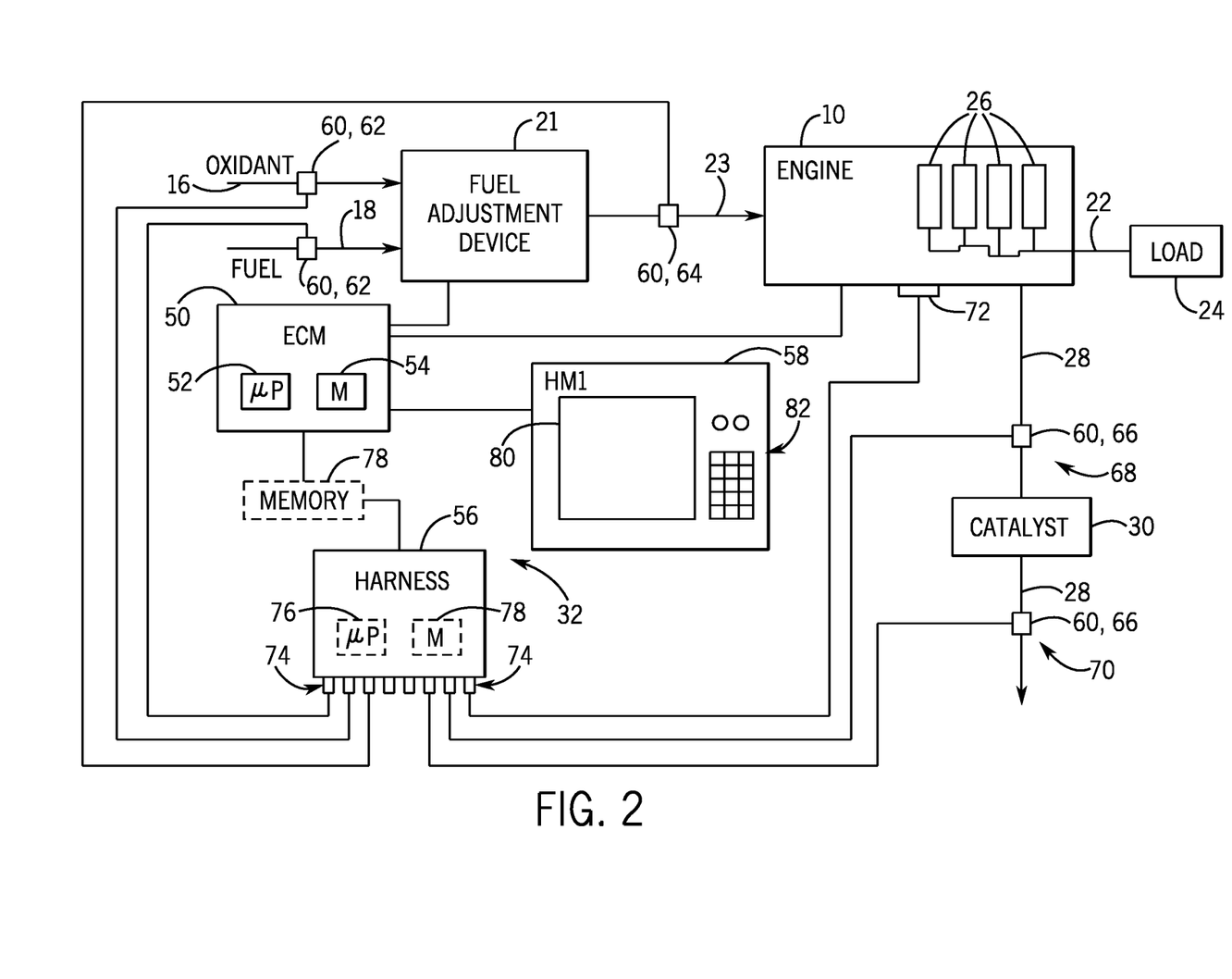
FIG. 2 is a block diagram of an embodiment of the engine system with an engine control module and a harness.

FIG. 2 is a block diagram of an embodiment of the engine system 8 and the engine control system 32. The engine control system 32 has an engine control module 50 (ECM) coupled to the engine 10 and to the fuel adjustment device 21. A control processor 52 of the engine control module 50 provides control signals to the engine 10 and to the fuel adjustment device 21 based at least in part on instructions loaded onto a control memory 54 (e.g., a non-transitory computer readable medium). The memory 54 may include any suitable articles of manufacture for storing data and executable instructions, such as random-access memory (RAM), read-only memory (ROM), rewritable flash memory, hard drives, and optical discs, among others. As discussed herein, inputs provided to the engine control module 50 affect the instructions loaded to the control memory 54 and executed by the control processor 52. For example, the engine control module 50 may receive sensor inputs (e.g., sensor feedback) received via a harness 56 and operator inputs received via a human machine interface 58 (HMI).

The harness 56 is configured to couple with multiple sensors 60 arranged throughout the engine system 8. In some embodiments, the harness 56 has a plurality of electrical connections and communications cables configured to receive sensor inputs from the multiple sensors 60. The sensors 60 may include, but are not limited to, temperatures sensors (e.g., thermocouples, thermistors, resistance temperature detector (RTD)), pressure sensors, composition sensors (e.g., oxygen (i.e., lambda) sensor, $NO_x$ sensor, carbon monoxide sensor), and vibration sensors (e.g., accelerometers, piezoelectric sensors), among others. That is, the sensors 60 of the engine system 8 may include different kinds of sensors 60. As discussed herein, the kinds of sensors 60 include, but are not limited to temperature sensors, pressure sensors, composition sensors, and vibration sensors. Moreover, the sensors 60 of the engine system 8 may include different types of sensors 60 arranged at particular locations relative to the flows through the engine system 8. As discussed herein, the types of sensors 60 include, but are not limited to pre-mix sensors 62 upstream of the fuel adjustment device 21, pre-combustion sensors 64 arranged between the fuel adjustment device 21 and the engine 10, exhaust sensors 66 arranged downstream of the engine 10, and engine sensors 72 coupled to the engine 10. Moreover, exhaust sensors 66 may include pre-catalyst sensors 68, post-catalyst sensors 70, or any combination thereof.

The sensors 60 may be arranged throughout the engine system 8 to monitor different components and flows of the engine system 8. For example, one or more pre-mix sensors 62 upstream of the fuel adjustment device 21 may be utilized to determine properties (e.g., oxygen concentration, temperature, pressure) of the oxidant 16 and/or properties (e.g., temperature, pressure) of the fuel 18, which may aid the control of the air/fuel ratio of the oxidant-fuel mixture 23 supplied to the engine 10 by the fuel adjustment device 21. One or more pre-combustion sensors 64 between the fuel adjustment device 21 and the engine 10 may be utilized to determine flow properties (e.g., the composition, the temperature, and/or the pressure) of the oxidant-fuel mixture 23 supplied to the engine 10. The engine control module 50 may adjust the oxidant-fuel mixture 23 in the fuel adjustment device 21 based at least in part on feedback from the pre-mix sensors 62, the pre-combustion sensors 64, or any combination thereof. In some embodiments, one or more exhaust sensors 66 may be utilized to determine the flow properties (e.g., the composition, the temperature, and/or the pressure) of the exhaust 28 collectively emitted from the cylinders 26. Additionally, or in the alternative, multiple exhaust sensors 60 may determine the flow properties of the exhaust 28 emitted from each cylinder 26. In some embodiments, one or more exhaust sensors 66 may be arranged to determine the flow properties of the exhaust 28 to be received by the catalyst 30, the exhaust 28 that exits the catalyst 30, or any combination thereof. That is, the one or more exhaust sensors 66 may include a pre-catalyst sensor 68, a post-catalyst sensor 70, or any combination thereof. Moreover, one or more engine sensors 72 may be used to measure properties of the engine 10, such as the temperature of the engine 10 or portions (e.g., cylinders 26) of the engine 10, a vibration profile, and the timing of the cylinders 26, among other engine properties.

The harness 56 couples to multiple sensors 60 via a plurality of sensor ports 74. The plurality of ports 74 facilitates coupling various configurations of sensors 60 (e.g., pre-mix sensors 62, pre-combustion sensors 64, exhaust sensors 66) to monitor the engine system 8. For example, the quantity of ports 74 of the harness 56 may be between approximately 2 to 100 ports, 5 to 75 ports, or 20 to 50 ports. Some configurations of sensors 60 may not couple to every port 74. That is, some ports 74 may be vacant for some sensor configurations (e.g., pre-catalyst control configuration). The harness 56 is configured to couple with multiple configurations of sensors 60, thereby enabling the harness 56 to be utilized with multiple engine systems 8 regardless of the engine size, engine capacity, engine load, fuel type, and so forth. That is, the harness 56 may be a cross-platform or multi-engine type harness operable with a variety of engine systems 8. As discussed herein, each configuration of sensors 60 is a set of sensors of certain types and kinds. As may be appreciated, some configurations may include one or more of each type or one or more of each kind of sensor 60. Additionally, some configurations do not include a certain type and/or a certain kind of sensor. For example, a pre-catalyst control configuration does not include post-catalyst sensors 70. Moreover, a post-catalyst control configuration includes one or more post-catalyst sensors 70 (e.g., composition sensors), and may include one or more pre-catalyst sensors 68.

The engine control system 32 determines the identity of sensors 60 coupled to the harness 56. In some embodiments, one or more of the ports 74 are configured to couple with sensors 60 having different identities including, but not limited to, the arrangement (e.g., disposition) of the sensor, the sensor type, sensor kind, sensor size, sensor manufacturer, among other characteristics. The engine control module 50 and/or the harness 56 of the engine control system 32 may identify the characteristics of the sensors 60 coupled to the harness 56. In some embodiments, the engine control module 50 identifies each sensor 60 via an output of the respective sensor 60, such as an identification signal, or a response to a handshake protocol. For example, the processor 52 may execute instructions stored in the memory 54 to compare a received output from the respective sensor 60 to data stored in the memory 54. The processor 52 may determine the identity of the sensor 60 via comparison of the output to a database or lookup table stored in the memory 54. As may be appreciated, the harness 56 may have a processor 76 and a memory 78 that enables identification of each sensor 60 with or without input from the engine control module 50. The memory 78 for the harness 56 may be arranged internally within the harness 56, or externally relative to the harness 56. Additionally, or in the alternative, each port 74 of the harness 56 may be configured to couple with only sensors 60 of certain types, kinds, sizes, or manufacturers. That is, some ports 74 may have universal connectors, and other ports may have proprietary connectors. Accordingly, the engine control system 32 may identify each sensor 60 via which port 74 the respective sensor 60 is coupled.

Upon determination of the identity of each sensor 60 coupled to the harness 56, the engine control system 32 may determine the configuration of sensors 60 of the engine system 8. In some embodiments, the engine control system 32 determines the configuration of sensors 60 by associating the set of identified sensors to a corresponding sensor configuration stored in a database or a lookup from memory 54, 78. The engine control system 32 may load calibrations from the memory 54, 78 for each of the sensors 60. The calibration for each sensor 60 enables the engine control module 50 to convert the sensor output (e.g., voltage, current) into measurements, such as temperature, pressure, composition, vibration, flow rate, and so forth. The detection and automatic loading of corresponding calibrations for sensors 60 coupled to the harness 56 by the engine control system 32 may reduce or eliminate manual loading of calibrations for sensors 60, thereby reducing manufacturing and maintenance costs. Additionally, the detection and automatic loading of corresponding calibrations by the engine control system 32 may reduce or eliminate calibration errors or downtime of the engine system 8 caused by incorrect calibrations for sensors 60. Moreover, automatically determining the identity of sensors 60 coupled to the harness 56 may increase the accuracy and/or the reliability of the feedback provided from the engine control module 50 to the HMI 58. For example, accuracy specifications may vary between sensor size and/or sensor manufacturer, and identification of the sensor size and/or manufacturer may increase the accuracy of feedback provided by the engine control module 50 through loading the appropriate calibrations for sensors 60 coupled to the harness 56.

In some embodiments, the engine control system 32 may enable the engine system 8 to be tested without coupling an operational configuration (e.g., pre-catalyst control configuration, post-catalyst control configuration) of sensors 60 to the harness 56 and loading the corresponding calibrations. That is, the engine control system 32 may enable the engine system 8 to be tested with a testing configuration of sensors 60 that does not have pre-catalyst sensors 68 or post-post catalyst sensors 70. Moreover, the engine control system 32 may enable the engine system 8 to be tested in a testing control mode without coupling the catalyst 30 to the engine 10 to receive the exhaust 28. Accordingly, the engine control system 32 facilitates the assembly and testing of the engine system 8 during the set up of the engine system 8 without arranging the sensors 60 of an operational configuration, thereby reducing time and costs associated with set up of the engine system 8.

The HMI 58 provides an operator with feedback regarding the operation of the engine system 8, and the HMI 58 enables the operator to control various aspects of the engine system 8. A display 80 of the HMI 58 may show operating conditions of the engine system 8 as determined by the engine control module 50 via the sensors 60 coupled to the engine system 8. For example, the HMI 58 may show flow properties (e.g., composition, temperature, pressure) of the oxidant 16, the fuel 18, the oxidant-fuel mixture 23, or the exhaust gas 28, or any combination thereof. Moreover, the HMI 58 may show one or more statuses of the engine system 8, such as the loading conditions on the engine 10, fluid level (e.g., lubricant, coolant), and run-time, among others. Inputs 82 of the HMI 58 enable the operator to control aspects of the engine system 8. For example, inputs 82 enable the operator to adjust the air/fuel ratio of the oxidant-fuel mixture 23, the speed of the engine 8, the load 24 driven by the engine 8, and various flows (e.g., oxidant flow, fuel flow, bypass flows, coolant flows) throughout the engine system 8.

The HMI 58 may control the engine system 8 based at least in part on feedback provided by the sensors 60. The determined configuration of the sensors 60 coupled to the harness 56 may affect the controls available to the engine control module 50. As may be appreciated, a first configuration of sensors 60 with a greater quantity of sensors 60 and/or a different assortment (e.g., types, kinds) of sensors 60 may provide richer feedback regarding the operation of the engine system 8 than a second configuration of sensors 60 with fewer sensors 60, only one type of sensor 60, or only one kind of sensor 60. For example, post-catalyst sensors 70 may provide feedback to the engine control module 50 related to the effectiveness of the catalyst 30 that pre-catalyst sensors 68 alone cannot provide. Accordingly, the configuration of sensors 60 coupled to the harness 56 may affect the controls shown on the display 80 of the HMI 58. For example, the HMI 58 may be configured to display the controls for a post-catalyst control mode utilizing feedback from post-catalyst sensors 70 for configurations of sensors 60 with post-catalyst sensors 70 coupled to the harness 56, and the HMI 58 may be configured to not display the controls for the post-catalyst control mode when configurations of sensors 60 without post-catalyst sensors 70 are coupled to the harness 56, such as pre-catalyst configurations. In some embodiments, the HMI 58 may disable operation of the engine system 8 until an operational configuration (e.g., pre-catalyst control configuration, post-catalyst control configuration) of sensors 60 is coupled to the engine system 8. That is, the HMI 58 may lockout an operator until a configuration of sensors 60 is arranged within the engine system 8 that would enable one or more emissions control modes of the engine system 8. However, the HMI 58 may enable an operator to override the lockout for testing of the engine 10 without an operational configuration of sensors 60 coupled to the engine system 8.

The HMI 58 may be configured to display the controls for a pre-catalyst control mode utilizing feedback from pre-catalyst sensors 68 for pre-catalyst control configurations. Additionally, the HMI 58 may be configured to display the controls for the pre-catalyst control mode and for the post-catalyst control mode utilizing feedback from pre-catalyst sensors 68 and post-catalyst sensors 70 for post-catalyst control configurations. When the HMI 58 is configured to not display the controls for a control mode (e.g., post-catalyst control mode) of the engine system 8, the display 80 may either be devoid of the respective controls for the disabled control mode or the display 80 may show the controls for the post-catalyst control mode as unselectable (e.g., grayed-out) by the operator until the appropriate one or more sensors 60 that enable the respective controls is coupled to the harness 56.

As discussed above, the efficiency and/or the effectiveness of the catalyst 30 may be affected the properties (e.g., composition, temperature, pressure, flow rate) of the exhaust 28 received by the catalyst 30. For example, some catalysts 30 are most effective at reducing emissions (e.g., nitrogen oxides, carbon monoxide, unreacted fuel) for exhaust 28 received from combustion within specific ranges of the oxidant-fuel ratio. The engine control system 32 may adjust the operation of the fuel adjustment device 21 and/or the engine 10 to affect the properties (e.g., emissions) of the exhaust 28 that exits the catalyst 30. In some embodiments, the engine control system 32 may control the properties (e.g., emissions) of the exhaust 28 that exits the catalyst 30 in a pre-catalyst control mode or a post-catalyst control mode. The pre-catalyst control mode may only utilize feedback from pre-catalyst sensors 66, thereby controlling the emissions of the exhaust 28 exiting the catalyst 30 in an open-loop control. The post-catalyst control mode may utilize feedback from post-catalyst sensors 70, thereby controlling the emissions of the exhaust 28 exiting the catalyst 30 in a closed-loop control.

Figure 3:
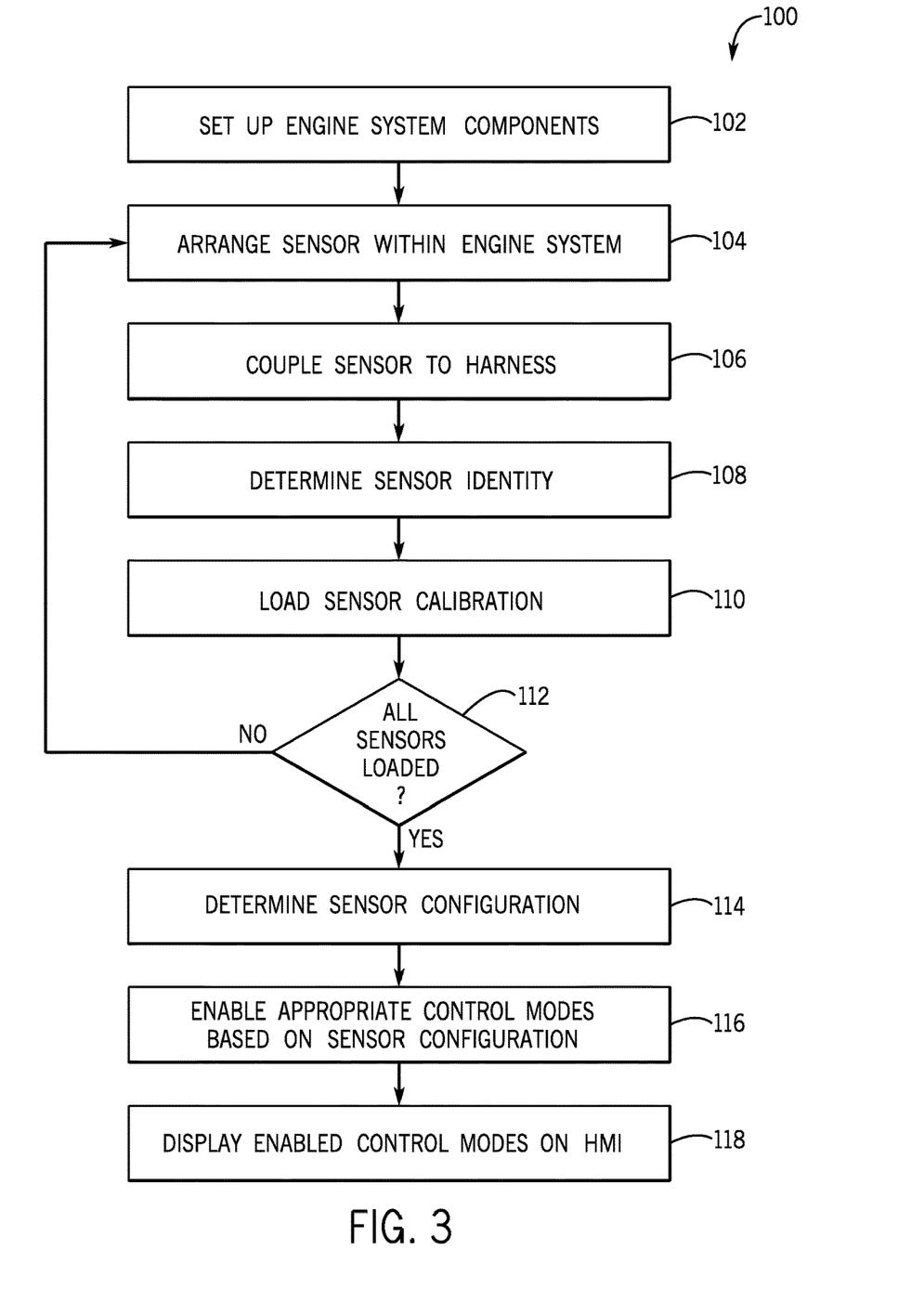
FIG. 3 is a flow diagram of an embodiment of a method for calibrating the engine system with a plurality of sensors.

FIG. 3 illustrates an embodiment of a method 100 of calibrating an engine system with a plurality of sensors. In some embodiments, a first step of the 100 method may be to set up (block 102) the engine system components (e.g., the engine, the fuel adjustment device, the catalyst, the engine control module) by arranging them as desired and coupling the engine system components together. When the engine system is set-up in a desired arrangement, an operator arranges (block 104) a sensor within the engine system. As described above, the sensor may be arranged as a pre-mix sensor disposed upstream of the fuel adjustment device, as a pre-combustion sensor between the fuel adjustment device and the engine, as an engine sensor coupled to the engine, or as an exhaust sensor arranged downstream of the engine. Moreover, the exhaust sensor may be a pre-catalyst sensor arranged downstream of the engine and upstream of the catalyst, and the exhaust sensor may be a post-catalyst sensor arranged downstream of the catalyst. The operator couples (block 106) the sensor to a port of the harness. In some embodiments, each sensor may be configured to couple with a subset (e.g., 1, 2, 3, 4, 5, 6, 7, 8, 9, 10) of the total quantity of ports of the harness. Upon coupling the sensor to the harness, the engine control system determines (block 108) the identity of the sensor. In some embodiments, the harness determines the identity of the sensor via a processor and memory integral with or coupled to the harness. As discussed above, the sensor identity may be determined via an identifiable sensor output, a handshake protocol between the engine control system and the sensor, which port the sensor is coupled, or any combination thereof. In some embodiments, the engine control system determines the sensor identity utilizing a look-up table or database stored in a memory of the engine control system.

The engine control system loads (block 110) an appropriate sensor calibration for the identified sensor, thereby enabling the engine control system to determine from the sensor output the properties (e.g., composition, temperature, pressure, vibration) of the engine system that are sensed by the respective sensor. The engine control system loads (block 110) the appropriate sensor calibration from a memory of the engine control system, the harness, or any combination thereof. After loading the sensor calibration, the operator and/or the engine control system determines (node 112) whether the calibrations for all of the desired sensors for a sensor configuration are loaded by the engine control system. If more sensors are to be added to the engine system for the desired configuration of sensors, then some or all of the blocks 104-110 may be repeated until all the calibrations for all of the sensors of the desired configuration are loaded. As may be appreciated, multiple sensors may be arranged (block 104), coupled (block 106), identified (block 108), and calibrated (110) at substantially the same time. That is, while FIG. 3 illustrates blocks 104-110 sequentially with respect to one sensor, multiple sensors may be arranged (block 104) within the engine system prior to coupling (block 106) the multiple sensors to the harness. Moreover, the engine control system may identify (block 108) multiple sensors approximately simultaneously, and the engine control system may load (block 110) the sensor calibrations for multiple sensors concurrently with one another.

Upon loading all of the sensor calibrations for the desired configuration of sensors, the engine control system determines (block 114) the sensor configuration based at least in part on the identities of the sensors arranged throughout the engine system. For example, the identification of one or more post-catalyst sensors may indicate that the sensor configuration is a post-catalyst control configuration, and the absence of one or more post-catalyst sensors may indicate that the sensor configuration is a pre-catalyst control configuration. Moreover, the engine control system may evaluate the identities of the sensors to determine whether the coupled sensors are compatible for an apparent configuration based on identified properties, such as the kind of sensor, the accuracy of the sensor, or the design conditions (e.g., maximum operating temperature, maximum operating pressure) of the sensor. For example, a post-catalyst control mode of the engine control system may utilize feedback from both a post-catalyst temperature sensor and a post-catalyst composition sensor. For example, if the engine control system identifies two post-catalyst temperature sensors, the engine control system may determine (block 114) that the sensor configuration is not a post-catalyst control configuration due to the incompatibility of the second post-catalyst temperature sensor and the absence of the post-catalyst composition sensor. Additionally, the engine control system may determine that a sensor is incompatible with a certain configuration (e.g., post-catalyst control configuration) if the identified accuracy and/or design conditions of the sensor are outside a design threshold for the control mode.

Upon determination (block 114) of the configuration of the sensors of the engine system, the engine control system enables (block 116) the appropriate control modes corresponding to the determined sensor configuration. As discussed above, a post-catalyst control configuration may include pre-catalyst sensors. Accordingly, the engine control system may enable (block 116) both a pre-catalyst control mode and a post-catalyst control mode for such a post-catalyst control configuration of sensors having pre-catalyst sensors and post-catalyst sensors. Where the engine control system did not determine (block 114) that a post-catalyst control configuration was present, the engine control system may enable (block 116) the pre-catalyst control mode and disable the post-catalyst control mode. In some embodiments, the engine control system has a default control mode (e.g., pre-catalyst control mode, testing control mode, manual control mode) that is enabled regardless of the configuration of sensors. The HMI displays (block 118) the enabled control mode, thereby providing the operator with feedback from the determined configuration of sensors and enabling the operator to adjust the engine system based on the feedback during operation of the engine system.

Figure 4:
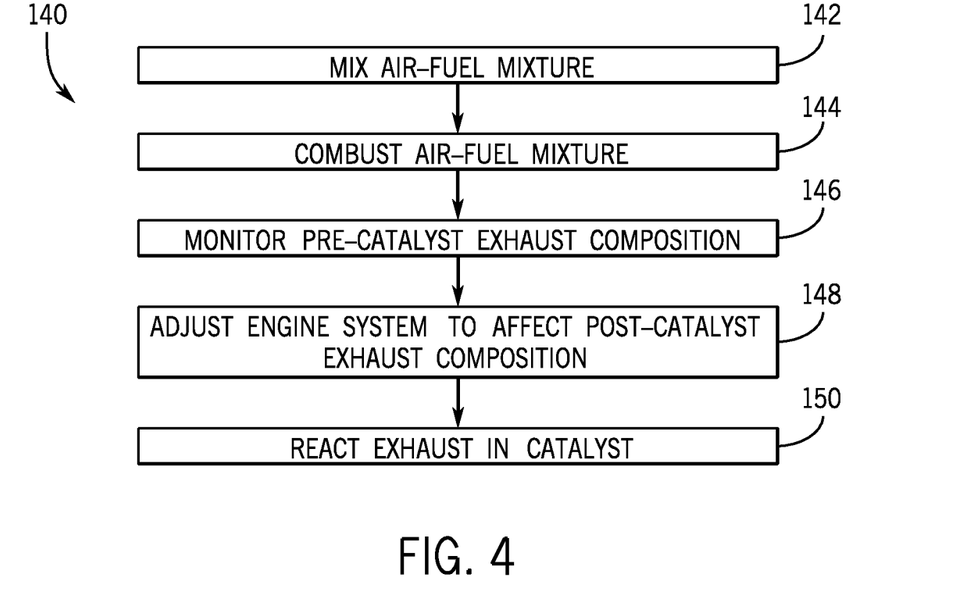
FIG. 4 is a flow diagram of an embodiment of a method for controlling emissions of an embodiment of the engine system in a pre-catalyst control mode.

FIG. 4 illustrates an embodiment of a method 140 of controlling the engine system in the pre-catalyst control mode with a pre-catalyst control configuration of sensors. The fuel adjustment device of the engine system mixes (block 142) air and fuel into the oxidant-fuel mixture that is directed to the engine. The engine combusts (block 144) the oxidant-fuel mixture within a combustion chamber, thereby driving a load via a shaft. As discussed above, the engine may be a reciprocating engine, and the engine combusts the oxidant-fuel mixture to drive a piston coupled to the shaft. Pre-catalyst sensors monitor (block 146) properties (e.g., composition, pressure, temperature) of the exhaust before the catalyst receives the exhaust.

The engine control system adjusts (block 148) the engine system based at least in part on feedback from the pre-catalyst sensors. The engine control system may adjust the engine system to affect properties of the exhaust that exits the catalyst. In some embodiments, the engine control system may adjust the oxidant-fuel ratio and/or the timing of the engine, to affect properties of the exhaust. The engine load and/or speed are adjusted based on the demands of the equipment coupled to the engine system. For example, engine systems that drive gas compression systems may vary the load and/or the speed to adjust the amount of flow and pressure provided by the gas compression system. For engine systems that drive electrical generators, the speed may be maintained substantially constant while the load is adjusted based at least in part on an electrical power demand. Additionally, or in the alternative, the engine control system may adjust the oxidant-fuel mixture to affect the temperature of the exhaust or the quantities of the unreacted oxidant and fuel in the exhaust. The composition of the exhaust (e.g., relative quantities of unreacted oxidant, unreacted fuel, nitrogen oxides, and carbon monoxide) that enters the catalyst may be controlled to approximate design conditions for the catalyst such that the composition of the exhaust that exits the catalyst has reduced emissions (e.g., nitrogen oxides, carbon monoxide, unreacted fuel. The catalyst may have one or more efficiency peaks that correspond to certain ranges of exhaust properties of the received exhaust. The desired composition of the exhaust that enters the catalyst may be affected by the engine settings (e.g., load, speed, engine coolant temperature, ignition timing), the site conditions (e.g., fuel quality, intake oxidant temperature, intake oxidant humidity, altitude), or any combination thereof. The catalyst reacts (block 150) with the exhaust, thereby reducing the emissions (e.g., nitrogen oxides, carbon monoxide, unreacted fuel) of the exhaust that exits the catalyst. Accordingly, the method 140 of controlling the engine system in the pre-catalyst control mode is an open-loop control mode with respect to control of the exhaust exiting the catalyst. That is, the engine control system controls the engine system and the exhaust exiting the catalyst without sensor feedback from the exhaust exiting the catalyst.

Figure 5:
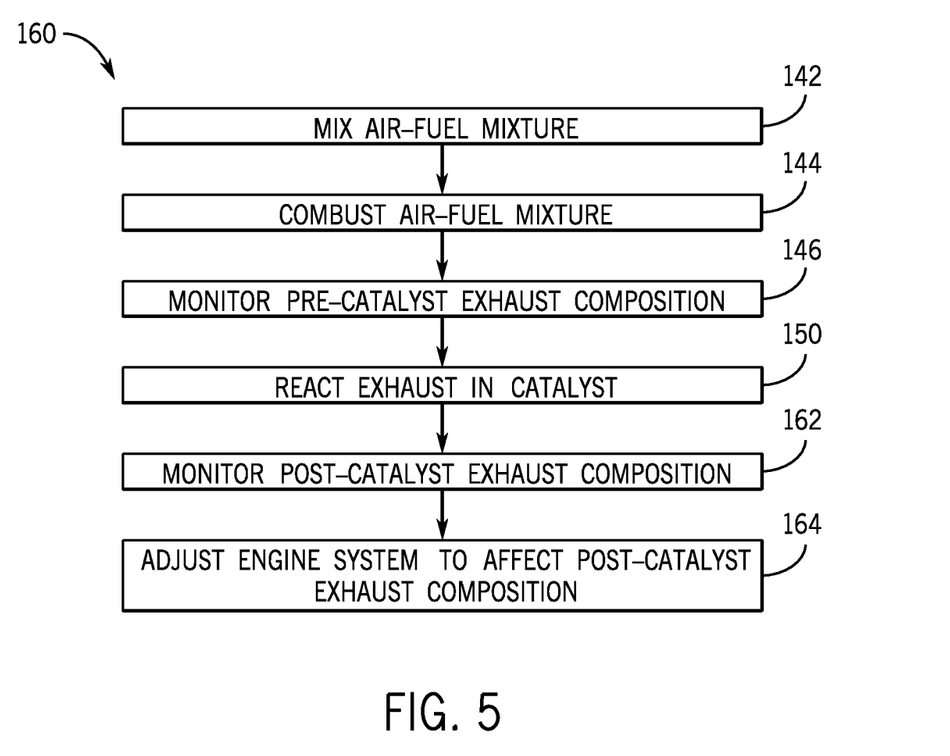
FIG. 5 is a flow diagram of an embodiment of a method for controlling emissions of an embodiment of the engine system in a post-catalyst control mode.

FIG. 5 illustrates an embodiment of a method 160 of controlling the engine system in the post-catalyst control mode with a post-catalyst control configuration of sensors. As discussed above, the fuel adjustment device of the engine system mixes (block 142) air and fuel into the oxidant-fuel mixture that is directed to the engine. The engine combusts (block 144) the oxidant-fuel mixture within a combustion chamber, thereby driving a load via a shaft. In some embodiments of the post-catalyst control mode, pre-catalyst sensors monitor (block 146) properties (e.g., composition, pressure, temperature) of the exhaust before the catalyst receives the exhaust. However, the feedback from the pre-catalyst sensors in the post-catalyst control configuration may supplement the feedback from the post-catalyst sensors. The catalyst reacts (block 150) with the exhaust, thereby reducing the emissions (e.g., nitrogen oxides, carbon monoxide, unreacted fuel) of the exhaust that exits the catalyst.

Post-catalyst sensors monitor (block 162) properties (e.g., composition, pressure, temperature) of the exhaust after the catalyst reacts with the exhaust (i.e., downstream of the catalyst). The engine control system adjusts (block 164) the engine system based at least in part on feedback from the post-catalyst sensors. In some embodiments, the engine control system adjusts (block 164) the engine system based at least in part on feedback from the post-catalyst sensors and pre-catalyst sensors of the post-catalyst control configuration of sensors. The engine control system may utilize feedback from the post-catalyst sensors to determine the effectiveness of the catalyst in reducing the emissions of the exhaust exiting the catalyst. In some embodiments, the engine control system may adjust the timing of the engine, the speed of the engine, and/or the load on the engine to affect properties of the exhaust exiting the catalyst. Additionally, or in the alternative, the engine control system may adjust the oxidant-fuel mixture to affect the temperature of the exhaust or the quantities of the unreacted oxidant and fuel in the exhaust. While the catalyst may have one or more efficiency peaks that correspond to certain ranges of exhaust properties of the received exhaust, the one or more efficiency peaks may shift during the lifetime of the catalyst. For example, the exhaust temperature for an efficiency peak of the catalyst may narrow from between approximately 400 to 540° C. (approximately 750 to 1000° F.) to between approximately 425 to 482° C. (approximately 800 to 900° F.). Moreover, the feedback from the post-catalyst sensors may enable the engine control system to tune the engine system to reduce the emissions more than with pre-catalyst sensors alone. Accordingly, the method 160 of controlling the engine system in the post-catalyst control mode is a closed-loop control mode with respect to control of the exhaust exiting the catalyst. That is, the engine control system controls the engine system and the exhaust exiting the catalyst utilizing sensor feedback from post-catalyst sensors monitoring the exhaust exiting the catalyst.

Technical effects of the invention include the identification of a sensor configuration of an engine system and automatic loading of sensor calibrations corresponding to the identified sensor configuration. Open-loop and closed-loop controls may be utilized to control the exhaust emissions after reaction with a catalyst, yet each control system may utilize feedback from different configuration of sensors. Moreover, identification of the sensor configuration enables the HMI of the engine system to display the appropriate controls available for the coupled configuration of sensors. The harness and engine control module described herein may facilitate utilization of the same harness and engine control module with various engine systems, such as engine systems of varying sized, load capacities, and exhaust processing systems (e.g., catalysts). Accordingly, the harness and engine control module described herein may facilitate reductions in manufacturing and/or maintenance costs relative to engine-specific harnesses or engine control modules.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   an engine control system, comprising:
   a harness comprising a processor and a plurality of ports, wherein each port of the plurality of ports is configured to couple with a sensor;
   a memory configured to store calibrations and control modes corresponding to a plurality of sensor configurations;
   wherein the processor is coupled to the memory, wherein the engine control system is configured to load a first set of calibrations from the memory corresponding to a first configuration of sensors and to control emissions from an engine system in a first control mode when the processor determines that the first configuration of sensors is coupled to the harness, and the engine control system is configured to load a second set of calibrations from the memory corresponding to a second configuration of sensors and to control the emissions from the engine system in a second control mode when the second configuration of sensors is coupled to the harness, wherein the processor is configured to identify each sensor of a plurality of sensors coupled to the harness based at least in part on an identification signal of the respective sensor, wherein the identification signal of each sensor corresponds to a property of the respective sensor.

2. The system of claim 1, comprising a plurality of sensors coupled to respective ports of the plurality of ports, wherein the plurality of sensors are configured to monitor one or more flows of the engine system, and the plurality of sensors comprise a composition sensor, a temperature sensor, or a pressure sensor, or any combination thereof.

3. The system of claim 1, wherein the first configuration of sensors comprises a pre-catalyst composition sensor, the first control mode is an open-loop pre-catalyst control mode, the second configuration of sensors comprises a post-catalyst composition sensor, and the second control mode is a closed-loop post-catalyst control mode.

4. The system of claim 3, comprising a catalyst configured to receive exhaust from an engine of the engine system, wherein the pre-catalyst composition sensor of the first configuration of sensors is disposed upstream of the catalyst relative to a flow direction of the exhaust, and the post-catalyst composition sensor of the second configuration of sensors is disposed downstream of the catalyst relative to the flow direction of the exhaust.

5. The system of claim 4, comprising a fuel adjustment device coupled to the processor and to the engine, wherein the fuel adjustment device is configured to supply an oxidant-fuel mixture to the engine, the open-loop pre-catalyst control mode is configured to control the oxidant-fuel mixture based at least in part on feedback from the pre-catalyst composition sensor, and the closed-loop post-catalyst control mode is configured to control the oxidant-fuel mixture based at least in part on feedback from the post-catalyst composition sensor.

6. The system of claim 1, wherein the first configuration of sensors comprises a pre-catalyst composition sensor, the first control mode is an open-loop pre-catalyst control mode, the second configuration of sensors comprises a pre-catalyst composition sensor and a post-catalyst composition sensor, and the second control mode is a closed-loop post-catalyst control mode.

7. The system of claim 6, comprising a human machine interface (HMI) coupled to an engine control module, wherein the engine control module is coupled to the harness and configured to display controls on the HMI for the open-loop pre-catalyst control mode and to disable controls on the HMI for the closed-loop post-catalyst control mode when the first configuration of sensors is coupled to the harness, and the engine control module is configured to enable controls on the HMI for the closed-loop post-catalyst control mode when the second configuration of sensors is coupled to the harness.

8. The system of claim 1, wherein the identification signal of each sensor comprises an identification signal of the respective sensor, and the property of each sensor comprises a type of the respective sensor, a size of the respective sensor, an accuracy of the respective sensor, design conditions of the respective sensor, or any combination thereof.

9. The system of claim 1, wherein the identification signal of each sensor comprises an identification signal indicative of a manufacturer of the respective sensor.

10. The system of claim 1, wherein the harness comprises the memory.

11. A method comprising:
determining, via a processor of a harness, an identity of each sensor of a plurality of sensors arranged within an engine system and coupled to the harness of the engine system based on an identification signal of the respective sensor, wherein the identification signal of the respective sensor corresponds to a property of the respective sensor, wherein exhaust sensors of the plurality of sensors are configured to monitor a flow property of engine exhaust and provide a feedback based on the flow property;
loading a calibration for each sensor of the plurality of sensors from a memory based at least in part on the determined identity of the respective sensor; and
determining, via the processor, a configuration of the plurality of sensors based at least in part on the determined identities of the plurality of sensors.

12. The method of claim 11, comprising enabling a pre-catalyst open-loop control mode and disabling a post-catalyst closed-loop control mode upon determining a pre-catalyst control configuration of the plurality of sensors, wherein the open-loop pre-catalyst control mode is configured to control an oxidant-fuel mixture to an engine of the engine system based at least in part on the feedback from a pre-catalyst composition sensor of the plurality of sensors.

13. The method of claim 11, comprising enabling a post-catalyst closed loop control mode upon determining a post-catalyst control configuration of the plurality of sensors, wherein the closed-loop post-catalyst control mode is configured to control an oxidant-fuel mixture to an engine of the engine system based at least in part on the feedback from a post-catalyst composition sensor of the plurality of sensors.

14. The method of claim 13, wherein the closed-loop post-catalyst control mode is configured to control the oxidant-fuel mixture to the engine of the engine system based at least in part on the feedback from a pre-catalyst sensor of the plurality of sensors.

15. The method of claim 11, comprising displaying a control mode of the engine system on a human machine interface of the engine system, wherein the control mode is enabled by the determined configuration of the plurality of sensors, and the control mode is configured to control an oxidant-fuel mixture to an engine of the engine system based at least in part on the feedback from the configuration of the plurality of sensors.

16. The method of claim 11, wherein the plurality of sensors comprise at least one composition sensor and at least one temperature sensor.

17. The method of claim 11, wherein the property of each sensor comprises a type of the respective sensor, a size of the respective sensor, a manufacturer of the respective sensor, an accuracy of the respective sensor, design conditions of the respective sensor, or any combination thereof.

18. The method of claim 11, wherein the identification signal of the respective sensor of the plurality of sensors comprises a response to a handshake protocol between an engine control module of the engine system and the respective sensor of the plurality of sensors.

19. A system comprising:
a human machine interface comprising a display and operator controls, wherein the display is configured to display information based at least in part on operation of an engine system coupled to the human machine interface, and the operator controls are configured to receive operator input;
an engine control system comprising:
a harness comprising a processor; and
wherein the harness is coupled to a plurality of sensors, wherein the processor is coupled to the human machine interface, wherein the engine control system is configured to determine a configuration of the plurality of sensors coupled to the harness based at least in part on identities of the plurality of sensors, and the identity of each sensor of the plurality of sensors corresponds to a determined property of the respective sensor of the plurality of sensors, wherein the processor is configured to determine the property of each sensor based on an identification signal of the respective sensor, the engine control system is configured to enable and disable the operator controls of the human machine interface based at least in part on the configuration of the plurality of sensors, and the processor is configured to control an exhaust from the engine system based at least in part on the operator input and feedback from the plurality of sensors.

20. The system of claim 19, wherein the engine control system comprises the plurality of sensors comprising a composition sensor, a temperature sensor, or a pressure sensor, or any combination thereof.

\* \* \* \* \*